May 5, 1942.  I. R. J. JAMES ET AL  2,282,060

GONIOMETER COIL FOR RADIO DIRECTION FINDING SYSTEMS

Filed Feb. 11, 1938

INVENTOR:—
IVOR REGINALD JOHN JAMES
CHARLES FREDERICK ALLEN WAGSTAFFE

BY
ATTORNEY

Patented May 5, 1942

2,282,060

UNITED STATES PATENT OFFICE 2,282,060

GONIOMETER COIL FOR RADIO DIRECTION FINDING SYSTEMS

Ivor Reginald John James and Charles Frederick Allen Wagstaffe, London, England, assignors to International Standard Electric Corporation, New York, N. Y.

Application February 11, 1938, Serial No. 189,978
In Great Britain March 19, 1937

1 Claim. (Cl. 250—11)

This invention relates to radio direction finding equipment and more particularly to goniometer coils for such apparatus.

For a goniometer to be free from octantal error, the essential requirement is that, for a given current in either field winding (fixed winding), the law connecting the E. M. F. induced in the search coil with its angular position must be a pure sine. To avoid other errors it is, of course, necessary for other and usual conditions to be met as well.

In goniometer coils as at present used having field and search coils wound on frameworks of cylindrical shape, with the turns of these windings evenly distributed over about ⅔ of the periphery of the cylinder it is found that the law of this winding arrangement departs somewhat from a sine. The development of a winding giving a pure sine was based upon the following considerations.

The actual curve obtained was analysed. Its law was found to be closely $$E = A_1 \sin \theta + A_3 \sin 3\theta$$

Terms containing odd harmonics above the 3rd were found to be negligible. Consideration showed that even harmonics could not exist.

It will be seen that if as proposed in the present invention a second winding is put on the search coil former identical to the first but placed at an angle of 60° to it, and the two windings put in series the resulting E. M. F. would be (with the same field current)

$$E = A_1(\sin \theta + \sin (\theta + 60°))$$
$$+ A_3(\sin 3\theta + \sin 3(\theta + 60°))$$
$$= \sqrt{3} A_1 \sin (\theta + 30°)$$

This means that the 3rd harmonic has disappeared and only the pure sine remains.

Due to the fact that the law is the same, except for the constants, whether the current is flowing in the field winding and the E. M. F. in the search coil is considered, or vice versa, the treatment mentioned of putting on a second winding at 60° to the first can be applied to either the search coil or the field coil. For convenience it is preferred to apply the second winding to the field coil.

Figure 1:
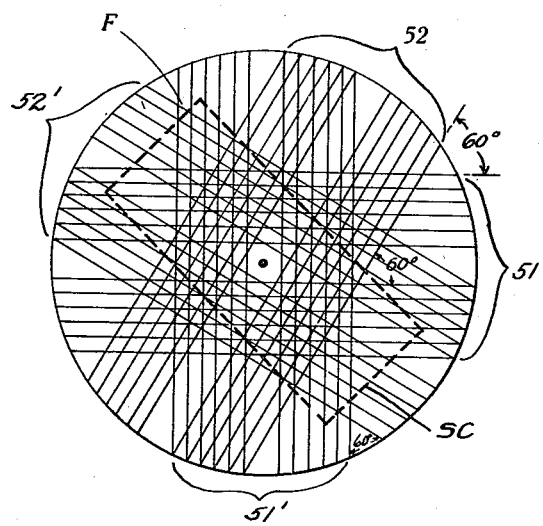
Figure 2:
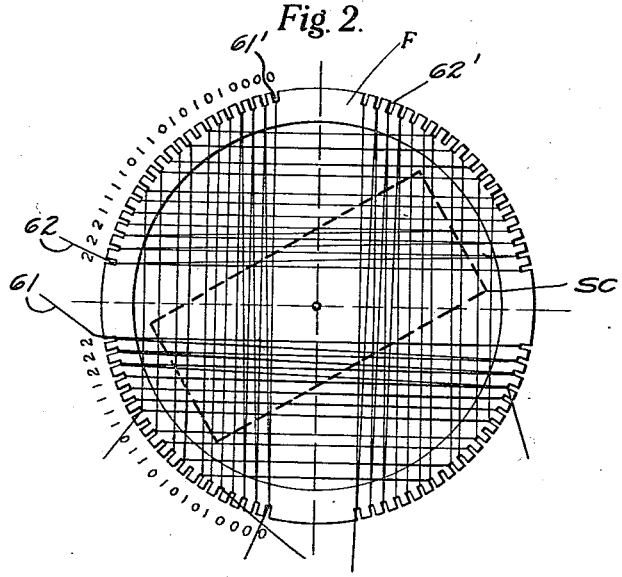

The invention may be more readily understood from the particular description made in connection with the accompanying drawing in which, Fig. 1 illustrates in plan view one form of goniometer in accordance with our invention; and Fig. 2 is a plan view showing a modified form of field coil in accordance with our invention.

Fig. 1 of the accompanying drawing illustrates a plan end view of one form of goniometer in accordance with our invention. One winding of the goniometer comprises two parts, 51, 52, wound on a former F at 60° to one another. The other winding comprises two parts or sections 51', 52' also arranged at 60° with respect to one another and at 90° with respect to winding sections 51, 52. A search coil SC indicated by dash lines is arranged within the field windings.

According to a modification instead of employing a second winding use is made of the general information obtained by the analysis, that a relatively simple distribution of turns on the surface of the supporting former or drum will give a sine law. A re-distribution of conductors (i. e. the number used per slot) based on the distribution which would result if the two windings were used, was found to give the required law. Thus an overall winding resulted which was more simple than the double wound arrangement.

It may be noted that the winding developed has a high maximum co-efficient of coupling— 0.75 approximately—a desirable feature in most direction finding equipments and a feature not generally possessed by the usual types of goniometer giving a law only relatively close to a pure sine.

The winding plan for the search coil may remain as it was originally in which each slot has the same number of turns. The field windings each have the general arrangement as for the search coil, but the turns per slot are according to a plan found to give the required law as mentioned earlier.

As a typical example the modification made to the original field winding of the goniometer of an Adcock direction finder is illustrated in Fig. 2 of the accompanying drawing and shown by the following field coil winding table. The first column shows the number of the slot considering that slot nearest the centre, or spindle, as number one and numbering outwards away from the centre. The remaining columns show the turns wound into the respective slots. Each half of the winding is numbered and treated in the same way.

| Slot number | Turns original goniometer | Turns new goniometer |
|---|---|---|
| 1 | 1 | 2 |
| 2 | 1 | 2 |
| 3 | 1 | 2 |
| 4 | 1 | 1 |
| 5 | 1 | 1 |
| 6 | 1 | 1 |
| 7 | 1 | 1 |
| 8 | 1 | 0 |
| 9 | 1 | 1 |
| 10 | 1 | 1 |
| 11 | 1 | 0 |
| 12 | 1 | 1 |
| 13 | 1 | 0 |
| 14 | 1 | 1 |
| 15 | 1 | 0 |
| 16 | 1 | 1 |
| 17 | 1 | 0 |
| 18 | 1 | 0 |
| 19 | 1 | 0 |
| 20 | 1 | 0 |

One of the advantages of making the modification to the field winding rather than to the search coil is that the inductance of the latter is usually varied according to the wavelength to be covered, and it should therefore remain the simplest possible winding.

The distribution indicated in the table, was arrived at by experiment. If two windings at an angle of 60° are assumed and two conductors in one slot, with currents flowing in them in opposite directions, are further assumed to neutralize each other, it can be shown that the two winding arrangement gives a concentration of effective turns towards the centre. Using this information as a guide, a distribution of turns, for the single winding shown in the table, was found after a few trials.

The arrangement of the two complete windings can be seen in Fig. 2. One winding comprises two sections 61, 62 with the distribution according to the above table. The other right angularly related winding comprises two sections 61', 62' with a similar distribution of the windings. The search coil SC completes the goniometer structure.

What is claimed is:

A radio goniometer for producing a substantially pure sine wave comprising a pair of relatively rotatable frames, a search coil carried by one of said frames, and two windings carried by the other frame and having their axes arranged substantially at right angles to each other, each winding comprising two winding sections arranged at substantially 60° with respect to one another and connected in series, said two winding sections being distributed over substantially two-thirds of their supporting frame.

IVOR REGINALD JOHN JAMES.
CHARLES FREDERICK ALLEN
WAGSTAFFE.